United States Patent

[11] 3,594,911

| [72] | Inventors | Allen B. Sherman;<br>Theodore A. Sherman, both of Pembroke, Mass. |
|---|---|---|
| [21] | Appl. No. | 885,715 |
| [22] | Filed | Dec. 17, 1969 |
| [45] | Patented | July 27, 1971 |
| [73] | Assignee | E. S. Ritchie & Sons, Inc.<br>Pembroke, Mass. |

[54] COMPASS
7 Claims, 3 Drawing Figs.

[52] U.S. Cl. ..................................... 33/225 R, 73/431
[51] Int. Cl. ..................................... G01c 17/18, G01c 17/24, G01c 17/38
[50] Field of Search ..................................... 73/431; 33/225, 224, 223, 222 A, 222 R

[56] References Cited
UNITED STATES PATENTS

| 1,601,081 | 9/1926 | Page | 33/222 |
| 2,285,658 | 6/1942 | Hitchcock | 350/67 |
| 2,428,346 | 9/1947 | White | 33/223 |
| 3,199,210 | 8/1965 | Ledgerwood | 33/223 |

FOREIGN PATENTS

| 323,699 | 1/1930 | Great Britain | |

*Primary Examiner*—Robert B. Hull
*Attorney*—Chittick, Pfund, Birch, Samuels and Gauthier

ABSTRACT: A compass adapted to be flush-mounted in a vertical bulkhead at an angle which increases the amount of overhead light falling on the compass card and which permits the compensator system to be adjusted without removing the compass from the bulkhead. The compass housing has an integral mounting ring which forms an angle with the housing open end through which the card is viewed.

PATENTED JUL 27 1971

3,594,911

Inventors:
ALLEN BUTMAN SHERMAN
THEODORE ALDEN SHERMAN
Chittick, Pfund, Birch, Samuels
& Gauthier
by
Attorneys

COMPASS

BACKGROUND OF THE INVENTION

A conventional compass which is designed to be flush-mounted in a vertical bulkhead has a circular mounting ring or flange which is fixed to the compass's exterior protective housing. To securely mount the compass within a hole cut in the vertical bulkhead, the mounting ring is bolted to the bulkhead.

Conventionally, the circular mounting ring is fixed to the cylindrical protective housing adjacent to the housing's forward open end where the transparent dome flange is gripped by the cylindrical housing. This construction orients the flush-mounted compass so that the housing open end is vertical, the compass card is horizontal and no more than about one-quarter of the card surface is exposed to vertical light rays. Also, only light sources located forward of the housing end cast any light on the card. Thus, the amount of light entering the dome from overhead sources is considerably limited by the vertical plane of the protective housing's opening.

SUMMARY OF THE INVENTION

This invention overcomes the foregoing problem by repositioning the mounting ring on the cylindrical protective housing. Instead of fixing the mounting ring so that its plane is parallel to the cylinder opening, the ring is canted so that its plane makes an angle of about 18° with the cylinder opening. Thus, when the compass mounting ring is bolted to the vertical bulkhead, the axis of the protective housing is tilted upwardly at an angle of about 18°. This thrusts the lower portion of the housing forward of the bulkhead thereby permitting considerable additional light to fall on the compass card and to illuminate the dome interior.

DESCRIPTION OF THE PREFERRED EMBODIMENT

Figure 3:
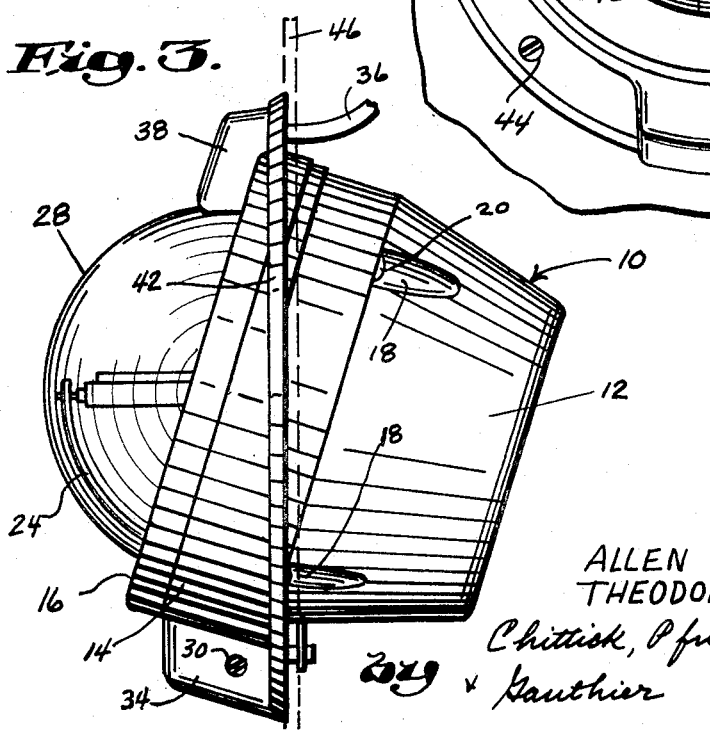
FIG. 3 is view in side elevation of the compass with the vertical bulkhead shown in dotted lines.

Referring to FIG. 3, the compass of this invention has an exterior protective housing 10, preferably of molded plastic, which has a generally cylindrical shape, although a portion of the closed end of the housing may taper or be rounded. The housing has two separate portions. The rear portion 12 includes the closed end and the housing flange 14 has an inwardly extending peripheral lip 16. The flange lip 16 has several tapped holes formed around the periphery of its rear-facing interior surface. The rear housing portion 12 has corresponding bolt holes 18 formed through its walls so that bolts 20 can be inserted through holes 18 to threadably engage and draw flange 14 into engagement with rear portion 12.

The primary purpose of the rear portion 12 of the protective housing is to enclose and support a flanged hemispherical plastic bowl 22 which has a small hole bored through the bowl's curved wall. Surrounding the convex surface of bowl 22 is an elastic expansion bladder (not shown) which communicates with the interior of bowl 22 through the small hole. The purpose of the expansion bladder is to prevent bubbles or excess pressure in the bowl, both of which are caused by temperature changes in the colorless fluid which completely fills the bowl to stabilize the gimbal system and the compass card.

Fastened to the concave or interior surface of bowl 22 is the gimbal system 24 which pivotally supports the compass card 26 in the well-known manner.

A transparent plastic hemispherical dome 28 has substantially the identical size and shape as bowl 22. Dome 28 has a peripheral flange which is adapted to mate with the peripheral flange of the bowl 22 to form a hollow sphere and is securely fastened thereto by a separate flange plate and bolts (not shown). As was previously stated, the spherical dome-bowl assembly is completely filled with colorless fluid to dampen the card and gimbal movements.

Figure 1:
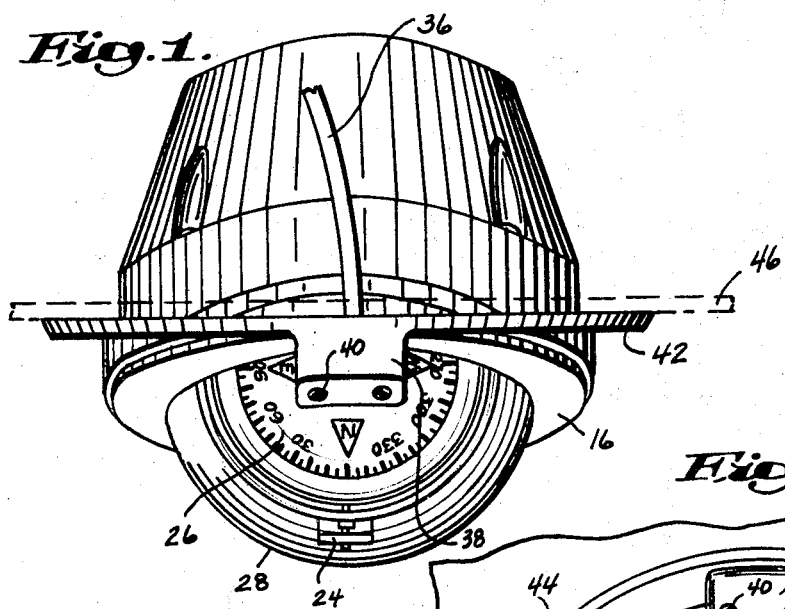
FIG. 1 is a plan view of the compass of this invention with the vertical bulkhead shown in dotted lines.
Figure 2:
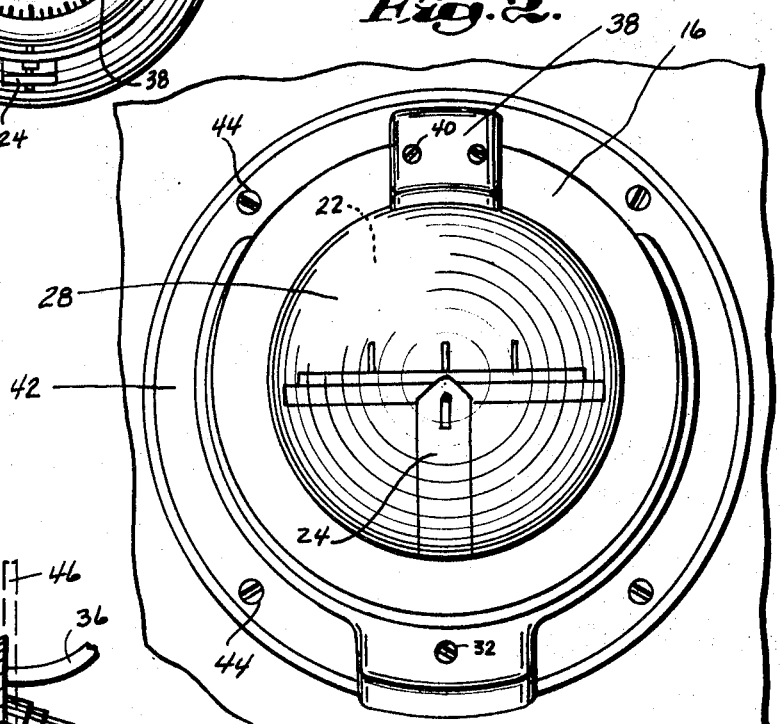
FIG. 2 is a view in front elevation of the compass mounted on the bulkhead.

On the lower exterior of the housing flange 14, a compensator system including four magnets on two crossed shafts is provided. These shafts have slotted ends 30 and 32 which are adapted to be revolved by a screwdriver to adjust the compensation setting. It will be seen in FIGS. 2 and 3 that the lower portion of flange 14 is provided with a hump 34 enclosing the compensator system and the hump has holes through which the slotted shaft ends 30 and 32 protrude.

On the upper exterior of the housing flange 14, a night lighting unit is provided. This unit is connected to an electrical power source by a cable 36 and is protected by a detachable cover 38 fixed to flange 14 by screw fasteners 40.

The foregoing detailed description has chiefly concerned the conventional features of the compass of this invention. The following description more directly relates to the inventive features of this invention.

The housing flange 14 is fitted with a mounting ring 42 which has peripheral holes through which bolts 44 are passed to mount the compass in the vertical bulkhead 46. Obviously, prior to mounting, an opening must be cut in the bulkhead to accommodate rear portion 12 of the protective housing. In this preferred embodiment, the mounting ring 42 forms the rear face of flange 14 and lip 16 forms the front face of flange 14. Lip 16 frames the compass opening through which card 26 is viewed. Lip 16 is perpendicular to the axis of the substantially cylindrical protective housing 10.

It will be seen that mounting ring 42 is positioned on flange 14 in such a way that at the top of the compass it passes closely adjacent to the flange lip 16 while at the bottom of the compass it is spaced a considerable distance from lip 16 (which forms the open end of the protective housing). Preferably, the plane of the mounting ring forms an angle of about 18° with the plane of the flange lip 16. However, it is believed that somewhat less advantageous results can be obtained with angles in the range of 10° to 35°.

It should be noted that the important feature of this invention is the angle formed by the planes of the mounting ring and the flange lip. It is not necessary to the proper functioning of this invention that the mounting ring 42 touch the flange lip 16. Instead of the embodiment shown in the drawings, the mounting ring could alternatively be fixed to the rear portion 12 of the housing. However, it must pass closer to flange lip 16 at the top of the compass than at the bottom.

When the compass is mounted in the vertical bulkhead as shown in FIG. 3, it is obvious that more overhead light can fall on the compass card than would occur if the plane of the housing opening were vertical. Likewise, it will be appreciated that by locating the compensator system forward of the bulkhead, it can be adjusted without removing the entire compass from the bulkhead. This last feature is also quite important.

The foregoing description obviously suggests many possible variations and modifications of this invention which would not depart from its spirit and scope. It should be understood, therefore, that the invention is not limited in its application to the details of structure specifically described or illustrated and that within the scope of the appended claims, it may be practiced otherwise than as specifically described or illustrated.

We claim:

1. In a magnetic navigational compass adapted to be flush-mounted in a vertical bulkhead, which compass includes:
   a. a flanged hemispherical bowl,
   b. a flanged hemispherical transparent dome positioned to mate with the flange of said bowl to form a hollow sphere,
   c. gimbal means fixed to the interior of said bowl,
   d. a compass card pivotally supported by said gimbal means, and e. an exterior protective housing having a cylindrical shape with an inwardly flanged open end, said protective housing supportably mounting said spherical bowl-dome assembly and enclosing said bowl and the flange of said dome, the improvement therein comprising a mounting ring fixed to and encircling said cylindrical housing, said mounting ring extending on said cylindrical housing from a point adjacent said flanged open end to a point spaced from said flanged open end whereby said mounting ring forms an angle with the plane of said open end in the range of 10° to 35°.

2. Apparatus of claim 1 wherein the plane of said mounting ring forms an angle of approximately 18° with the plane of the inwardly flanged open end.

3. Apparatus of claim 1 further comprising a compensator system mounted on the exterior of said protective housing at a point located between said mounting ring and said flanged open end whereby the compensator system is completely accessible for adjustment while the compass is mounted on the vertical bulkhead.

4. Apparatus of claim 1 wherein said protective housing is comprised of a substantially cylindrical rear portion having a closed end and an open end, and a flange lip portion which seats onto the rear portion open end and is fastened thereto, said mounting ring being affixed to the flange lip portion.

5. Apparatus of claim 4 further comprising a night lighting unit mounted on said protective housing flange lip portion.

6. Apparatus of claim 4 wherein a hump is provided in said protective housing flange lip portion to enclose and protect the compensator system, said hump having holes bored therein through which the compensator shafts protrude for adjustment accessibility.

7. Apparatus of claim 4 wherein said flange lip portion comprises an inwardly extending peripheral lip forming the forward flange lip portion face, and the circular mounting ring forming the rearward flange lip portion face, the forward and rearward faces forming an angle therebetween.